Dec. 4, 1934.     B. MECHLOVITS     1,982,877

MOLD FOR MANUFACTURING ORNAMENTS

Filed April 25, 1933     3 Sheets-Sheet 1

INVENTOR
BERNAT MECHLOVITS
BY
ATTORNEY

Dec. 4, 1934.  B. MECHLOVITS  1,982,877
MOLD FOR MANUFACTURING ORNAMENTS
Filed April 25, 1933  3 Sheets-Sheet 2
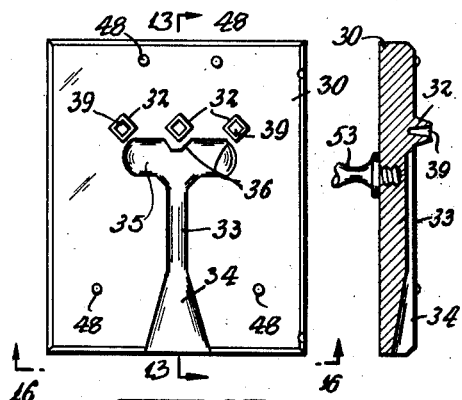
Fig. 12.  Fig. 13.
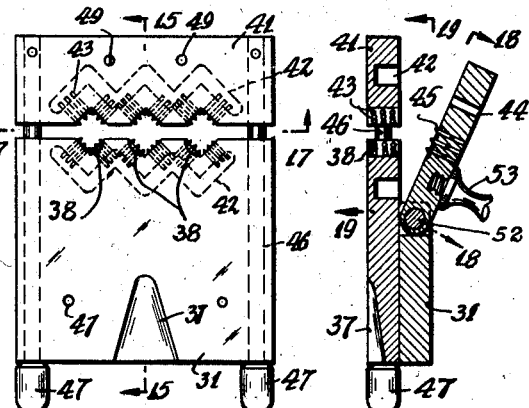
Fig. 14.  Fig. 15.
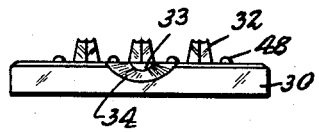
Fig. 16.
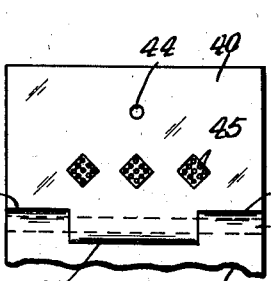
Fig. 18.
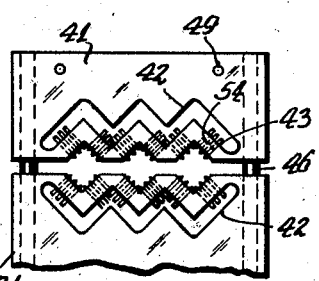
Fig. 19.
Fig. 17.
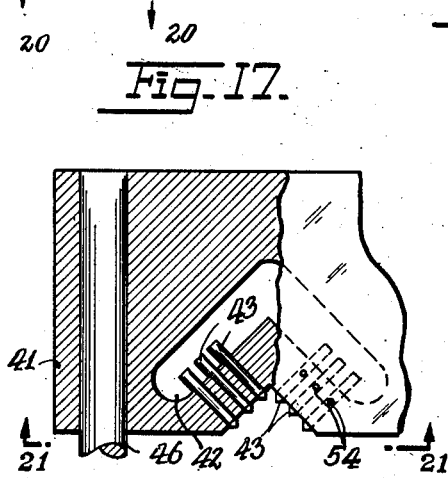
Fig. 20.
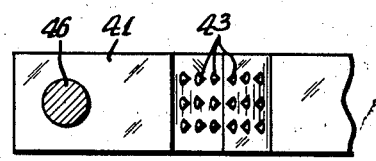
Fig. 21.
INVENTOR
BERNAT MECHLOVITS
BY
ATTORNEY Dec. 4, 1934. B. MECHLOVITS 1,982,877
MOLD FOR MANUFACTURING ORNAMENTS
Filed April 25, 1933 3 Sheets-Sheet 3
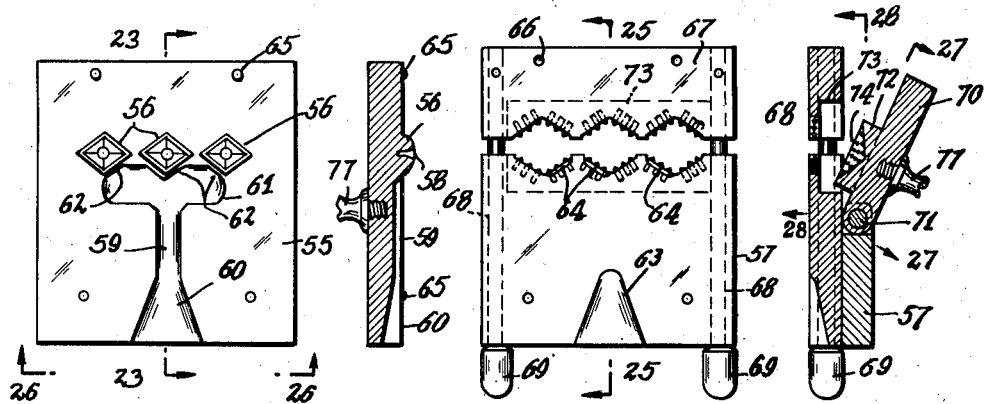
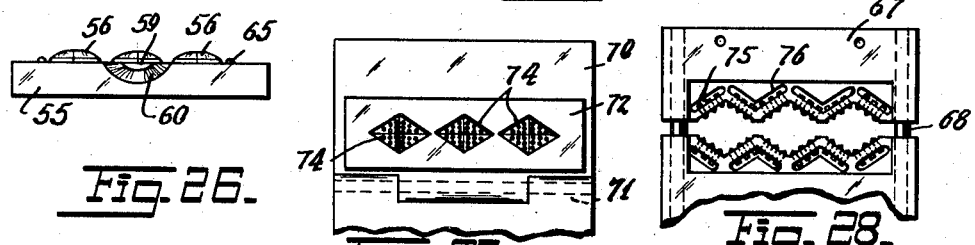
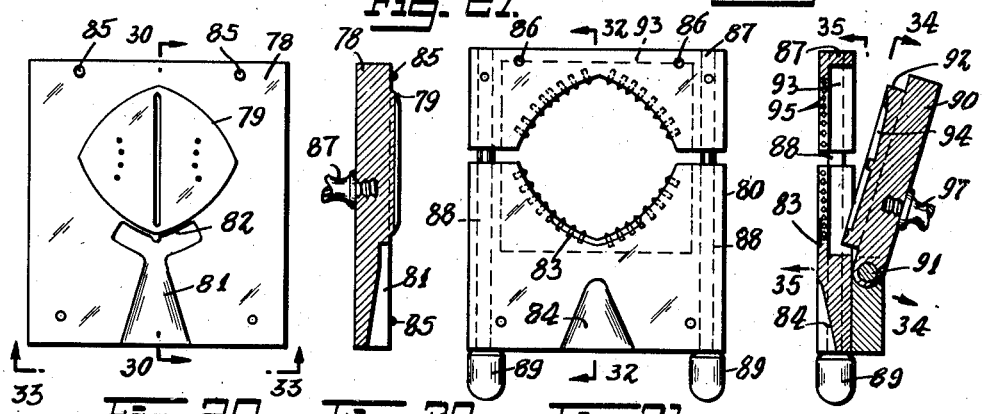
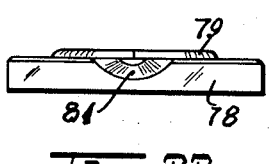
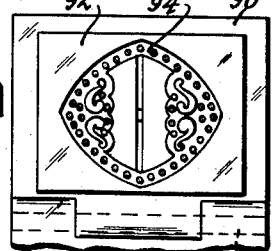
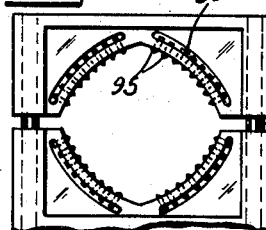
INVENTOR
BERNAT MECHLOVITS
BY
ATTORNEY Patented Dec. 4, 1934

1,982,877

UNITED STATES PATENT OFFICE 1,982,877

MOLD FOR MANUFACTURING ORNAMENTS

Bernat Mechlovits, New York, N. Y.

Application April 25, 1933, Serial No. 667,783

8 Claims. (Cl. 22—153)

This invention relates to new and useful improvements in ornaments for buttons, buckles, brooches, etc., and molds for manufacturing said ornaments, and methods for casting same.

The invention has for an object the construction of a mold, the provision of a method and the manufacture of ornaments which have jewel settings on the edges and upon one end. The invention particularly relates to casting the ornaments with the jewel settings as stated.

Still further the invention contemplates an arrangement whereby the edges may be straight or curved but limited to angles in which conical pointed pins for forming the jewel settings do not restrain removal of the ornament when finished. Still further it is proposed to arrange the end either straight or of any other shape within limits to adapt its removal from the mold as hereinafter further explained.

Still further the invention contemplates the construction of a mold for casting ornaments as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 12 is an elevational view looking in the direction of the line 12—12 of Fig. 11.

Fig. 13 is a sectional view taken on the line 13—13 of Fig. 12.

Fig. 14 is an elevational view looking in the direction of the line 14—14 of Fig. 11.

Fig. 15 is a sectional view taken on the line 15—15 of Fig. 14.

Fig. 16 is an edge elevational view looking in the direction of the line 16—16 of Fig. 12.

Fig. 17 is a sectional view taken on the line 17—17 of Fig. 14.

Fig. 18 is a fragmentary elevational view seen as though looking in the direction of the line 18—18 of Fig. 15.

Fig. 19 is a fragmentary elevational view seen as though looking in the direction of the line 19—19 of Fig. 15.

Fig. 20 is a fragmentary enlarged sectional view taken on the line 20—20 of Fig. 17.

Fig. 21 is a sectional view taken on the line 21—21 of Fig. 20.

Fig. 22 is a view similar to Fig. 12 but illustrating the features of the different molds.

Fig. 23 is a sectional view taken on the line 23—23 of Fig. 22.

Fig. 24 is a view similar to Fig. 14 but illustrating a different mold.

Fig. 25 is a sectional view taken on the line 25—25 of Fig. 24.

Fig. 26 is an edge elevational view looking in the direction of the line 26—26 of Fig. 22.

Fig. 27 is a fragmentary elevational view looking in the direction of the line 27—27 of Fig. 25.

Fig. 28 is a fragmentary elevational view looking in the direction of the line 28—28 of Fig. 25.

Fig. 29 is another view similar to Fig. 12 but illustrating a piece of another mold.

Fig. 30 is a sectional view taken on the line 30—30 of Fig. 29.

Fig. 31 is another view similar to Fig. 14 but illustrating another section of the mold in the form of the invention illustrated in Fig. 29.

Fig. 32 is a sectional view taken on the line 32—32 of Fig. 31.

Fig. 33 is an edge elevational view looking in the direction of the line 33—33 of Fig. 29.

Fig. 34 is a fragmentary elevational view looking in the direction of the line 34—34 of Fig. 32.

Fig. 35 is a fragmentary elevational view looking in the direction of the line 35—35 of Fig. 32.

Figure 1:
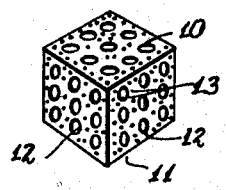
Fig. 1 is a perspective view of a jewel ornament constructed according to this invention, shown with the bottom side disposed upwards.
Figure 2:
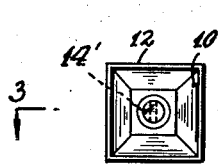
Fig. 2 is a plan view of Fig. 1.
Figure 3:
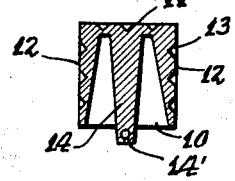
Fig. 3 is a sectional view taken on the line 3—3 of Fig. 2.

The ornament illustrated in Figs. 1-3 inclusive is arranged with a bottom 10, a top end 11 and four sides 12 at right angles to each other. The end 11 and the sides 12 are formed with a plurality of jewelry setting recesses 13. The bottom of the ornament is provided with a stem 14 and an eye 14' is formed in the said stem, by which it may be attached to another article. The important feature of the ornament resides in the fact that it is formed with cast jewelry setting recesses 13 on the end 11 and on all of the four sides 12.

Figure 4:
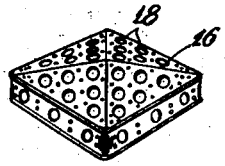
Fig. 4 is a perspective view of another ornament constructed according to the same invention.
Figure 5:
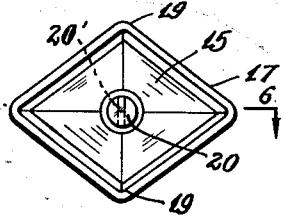
Fig. 5 is a bottom elevational view of Fig. 4.
Figure 6:
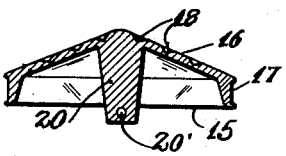
Fig. 6 is a sectional view taken on the line 6—6 of Fig. 5.

In Figs. 4, 5 and 6 another ornament has been disclosed which is constructed according to the same general principles of the ornament disclosed in Figs. 1–3. More particularly this ornament is of diamond shape and has a bottom 15, a top 16 and sides 17. The top or end 16 as well as the sides 17 are formed with jewelry setting recesses 18. The feature of the ornament lies in the fact that these recesses are cast at one time in all of the faces mentioned. The diamond shape of the ornament is clearly illustrated in Figs. 4 and 5. In order to successfully cast the ornament as hereinafter further described the bottom and top points 19 must be 45° or more, that is an obtuse angle. When thus arranged the ornament may be cast since the mold may be constructed to separate upon a horizontal center.

The end 16 of the ornament is shown of pyramid form which pyramid shape must be limited so that the apex is an obtuse angle or an angle 45°. This ornament is also provided with a stud 20 and eye 20' by which it may be attached.

Figure 7:
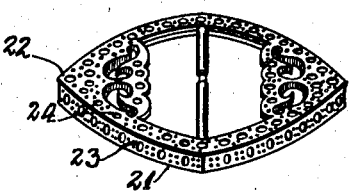
Fig. 7 is a perspective view of another ornament constructed according to the same invention.
Figure 8:
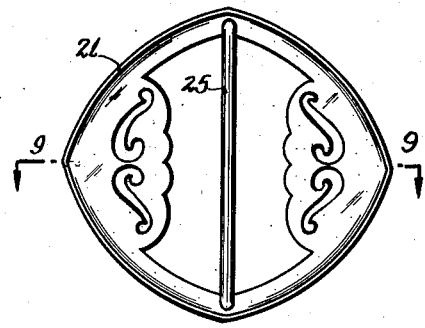
Fig. 8 is a bottom elevational view of Fig. 7.
Figure 9:
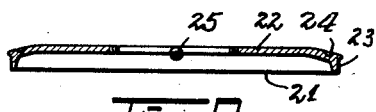
Fig. 9 is a sectional view taken on the line 9—9 of Fig. 8.
Figure 10:
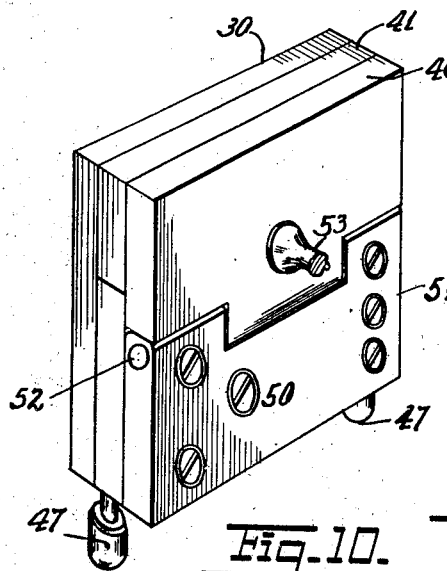
Fig. 10 is a perspective view of a mold for manufacturing the ornament illustrated in Figs. 1-3 inclusive.
Figure 11:
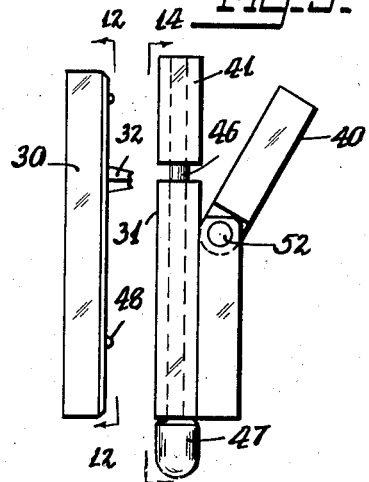
Fig. 11 is an edge elevational view of Fig. 10 illustrated with the several parts of the mold separated.

In Figs. 7, 8 and 9 another ornament has been disclosed which is also constructed according to the same invention. This ornament is of substantially oval shape and is formed with a bottom 21, a top 22 and sides 23. The sides 23 and the top 22 are formed with a plurality of jewelry setting recesses 24 cast therein in one operation. This ornament is shown with a transverse bar 25 by which it may be mounted. The sides 23 are shown arranged above and below horizontal center line, see Fig. 8 wherein the ends of this horizontal center line constitute the greatest width of the ornament. Still further the bottom and top points of the ornament is a larger angle than 45°. This is necessary so that the ornament may be removed from the mold which is to be hereinafter described.

Hereinafter molds will be described for forming each of the three distinct types of ornaments previously mentioned.

In Figs. 10–21 inclusive a mold has been illustrated for forming the ornament illustrated in Figs. 1–3. This mold comprises a male die 30 adapted to engage in face contact with a female die 31. The male die is arranged so as to limit or locate the bottom side of the ornament in a manner so that the bottom edge of the ornament is in the face of the female die and the ornament itself extends completely into the female die.

The male die 30 is formed with projections 32 adapted to engage into the female die and limit or form the bottom of the ornament. The die has been constructed to form three ornaments of cubic shape at one time. This may be clearly seen from inspecting for example Figs. 12 and 14 wherein the parts for forming the ornaments are arranged so that the ornaments are in position with diametrically opposite edges on the horizontal and the other diametrically opposite edges on the vertical. Passages are formed in the adjacent faces of the male and female dies to guide the molten metal to the casting space between the die sections. The male die 30 is provided with a passage 33 having an enlarged entrance 34 and extending to a base area 35 which has sides 36 arranged substantially parallel to one of the sides of the male projections 32.

The female die 31 is provided with a passage 37 adapted to set over the entrance passage 34 so as to provide a sufficiently large entrance through which the molten metal may be poured. The female die 31 is provided with openings into which the projections 32 may engage. On the face of the female die one of the sides of each of the openings is formed with small recesses 38 adapted to project over the small areas which separate the recess 35 with the sides of the male projections 32. In other words the molten metal may enter the passages 34, 37, pass along the passage 33, through the recess 35 and then the recesses 38 and in between the inner faces of the openings in the female die and the outer faces of the projections in the male die.

The projections 32 are formed with central recesses 39 to form the studs 14 of the ornament. The projections 32 are arranged so as to form the bottom or inside of the ornament. The openings in the female die are arranged so as to form the outer sides 12 and the female die is provided with a movable section 40 which when in closed position is adapted to form the ends of the ornament, that is, the ends 11 of the ornament described in Figs. 1–3.

The female die 31 is constructed of several separable sections which include a head piece 41 edgewise separable from the main portion of the die. This head section is arranged so that the contacting faces of it and the main portion of the die form the horizontal center of the openings in the female die. In Fig. 14 the head section is shown edgewise separated from the main portion of the die. The section 40 is arranged so as to be endwise separable from the rear face of the section 41. The openings in the female die extend completely across the head piece 41 and the main portion of the die which at its area is of the same width as the head piece. This arrangement provides for the back piece 40 forming the upper ends of the ornaments.

The rear faces of the head piece 41 and the main portion of the die immediately below the head piece 41 are formed with recesses 42 substantially following the contours of the openings in the female die. A plurality of pins 43 are engaged through the walls between the recesses 42 and the openings in the female die and have their ends of substantially conical shape and slightly projecting into the openings so as to form the settings for the jewels when the ornaments are cast. These pins only form the settings along the sides 12 of the ornament.

The pins 43 while arranged tight so that they cannot move, in other words they are jammed into the openings through which they pass, are also arranged slightly out of shape relative to the openings, not shown on the drawings, so that air may pass from the openings in the female die to the recesses 42. Openings 44 in the back piece 40 are arranged to align with the recesses 42 so as to allow the escape of air from the recesses. These air passages tend to allow the escape of air from the openings in the female portion of the die so that perfect castings are formed.

As the metal enters it is necessary that the air pass out and this is allowed by the air passing through portions of the openings through which the pins 43 extend. The back piece 40 is provided with a plurality of pins 45 adapted to form the settings for the jewels upon the end 11 of the ornament. These pins are mounted within passages formed in the back piece. The relation between the passages and pins is the same as described relative to the pins 43 that is small amounts of air may pass from the opening in the female die to the exterior.

From inspecting Figs. 12 and 14 it will be realized that the ornaments illustrated in Figs. 1–3 are cast in position in which the opposite corners are horizontal. The bottom and top corners are on the vertical and it is necessary that the angles of the corners on the vertical be 45° or obtuse angles. If thus arranged the conical shaped points or the pins 43 will not be able to hold the ornaments after the head piece 41 is moved edgewise. Thus the ornaments may be removed after being cast. The head of the pins 43 preferably should be approximately of 45° angles in any transverse cross section. This is not illustrated in great detail on the drawings but may be seen from inspecting Fig. 14.

The head piece 41 is fixed upon a pair of rods 46 which slidably pass through the main portion of the female die and which extends from one end. Knobs or heads 47 are fixed upon these extended ends and limit the amount of motion of the head piece. Consequently the knobs 47 may be pressed against a work table or other object to cause the head piece to move upwards and release the castings when finished. Several pegs 48 project from the metal die 30 and are adapted to engage in receiving openings 49 in the main portion of the female die and in the head piece 41 so as to truly align the male and female dies during the casting operation.

The back piece 40 is formed with a center lip 50 engaged between lugs 51 from the main portion of the female die and a pintle pin 52 engages through the lip 50 and the lugs 51 for hingedly mounting the back piece 40. In Fig. 15 it is shown hinged backwards away from intimate contact with the rear face of the main portion of the die. Of course during the operation of casting it must be in intimate contact. Handles 53 are mounted upon the outside of the male die 30 and the outside of the back piece 40 so that the parts may be readily separated when necessary. The pins 43 may be properly set within the openings which support them by first moving them into proper positions and then clamping them into these positions by punch marks 54 clearly illustrated in Fig. 19. These punch marks deform the metal slightly, a sufficient amount to clamp the pins in place.

In Figs. 22–28 inclusive a mold has been illustrated for manufacturing the ornaments illustrated in Figs. 4–6 inclusive. This mold is very similar in construction to the mold illustrated in Figs. 10–21 inclusive and merely distinguishes in the details relating to the openings in the female die and the projections from the male die. More particularly this die may be understood with the following description: The male portion 55 of the die is provided with male projections 56 adapted to engage into openings formed in the female portion 57 of the die. The projections 56 are provided with recesses 58 to form the stud portions 20 of the ornament. The projections 56 are so arranged as to have their major widths upon the horizontal and the minor widths upon the vertical. The minor corners are 45° or less as previously described and for the same reasons. The male die 55 is provided with passages for the molten metal. A main passage 59 is formed in the male die which communicates with an entrance enlargement 60 and with a base enlargement 61 having sides 62 parallel to and closely spaced from the sides of the projections 56. The female portion of the die is provided with a recess 63 to cooperate with the entrance recess 60 and with recesses 64 upon one of the sides of each of the openings so that the molten metal may pass from the base recess 61 into the openings and around the metal projections. Pegs 65 project from the metal die 55 and are engageable in openings 66 formed in the female die so that the die sections may be held in proper alignment during the casting.

The female die is provided with a separable head piece 67 arranged so that its bottom face when in intimate contact with the main portion of the female die is located at the horizontal center of the openings for forming the ornaments. The head piece is fixed upon a pair of rods 68 slidably engaged through the main portion of the female die and at the other ends provided with heads 69.

The female die 57 is also provided with a separable back piece 70 which is hingedly supported at its lower edge by a pin 71. This back piece is provided with a projection 72 adapted to engage into a recess 73 formed in the back face of the head piece 67 and the main piece of the female die which is immediately below the head piece. The front face of the projection 70 is formed with a concaved recess 74 having a plurality of projecting pin heads adapted to form the settings for the jewel upon the end 16 of the ornament. The sides of the opening in the female die are formed with projecting pins 75 adapted to form the settings for jewels upon the side 17 of the ornament. A plurality of recesses 76 are arranged within the head piece 67 and the main portion of the die immediately surrounding the openings in the female die so that the pin 75 may be properly set as previously described relative to the form of the invention illustrated in Figs. 10–21. These pins and openings are arranged similar as to air passage so that air cannot be entrapped within the openings in the female die and possibly restrict the entrance of the molten metal. Handles 77 are mounted upon the outside of the male die and the back piece 70 in the female die.

In Figs. 29–35 another mold has been disclosed which is adapted to make the ornaments illustrated in Figs. 7–9 inclusive. The principle of this mold is similar to the molds previously described. The mold comprises a male die 78 formed with a male projection 79 adapted to engage within an opening in a female die 80. The male die is provided with a recess 81 for the passage of the molten metal which recess has sides 82 terminating a short distance from the sides of the projection 79. A recess 83 is formed upon the contacting face of the female die immediately adjacent one side of the opening and is adapted to allow the passage of the molten metal from the passage 81 into the opening of the female die. A recess 84 is formed in the face of the female die for coaction with the passage 81 to better allow the passage of the molten metal. The male die is provided with projecting pegs 85 which are adapted to engage in openings 86 formed in the female die so that the dies may be properly aligned during the casting operation.

The female die is made from several separable sections including a head piece 87 which is edgewise separable. This head piece is fixed upon rods 88 slidably engaged through the main portion of the die and extending to the exterior and there provided with knobs or heads 89. The female die is also provided with a back piece 90 which is hingedly mounted at its lower edge by a pin 91 mounted upon the main portion of the female die. This back piece has a projection 92 adapted to engage in a recess 93 in the rear face of the head piece 87 and the main portion of the die which is immedately below the head piece. This main portion is of the same width as the head piece. The front face of the projection 92 is formed with a recess 94 adapted to form the top side of the ornament illustrated in Figs. 7–9 inclusive and is provided with a plurality of projecting pins which form the jewel settings upon the front 22 of the ornament. A plurality of projecting pins 95 are arranged upon the sides of the openings in the female die. These pins 95 may be properly adjusted by reason of their rear ends extending into recesses 96 formed in the rear face of the head piece 89 and the main portion of the female die immediately below the head piece. The relation between the pins and the openings in which they are mounted are similar to the corresponding relation of the pins 43 with their openings, that is, provision is made for the passage of hot amounts of air so that the molten metal may easily enter the die. Handles 97 are arranged upon the outsides of the metal die 79 and the back piece 90. The pins 95 form the jewel settings on the edges 23 of the ornament while the pins mounted on the recesses 94 form the jewel settings upon the front side 32 of the ornament. In other respects this mold is similar to the ones previously described and will readily be recognized.

The operation of the molds is as follows:—
The back pieces and head pieces should be closed firmly against the main portion of the female die. Then the male die and female die engaged with each other by reason of the pegs from the male die engaging the corresponding openings in the female die. Next the molten metal is poured into the entrances provided therefor. This molten metal passes along and enters the openings in the female die and surrounds the projections from the male die. When this molten metal becomes hard, the male die should be removed which is facilitated by reason of the edges thereof being chamfered illustrated clearly in Figs. 12 and 13. Then the knobs should be moved relative to the main portions of the female dies so as to move the head pieces edgewise. Next the back pieces should be moved endwise upon their hinges. Then the cast ornament may be pried loose. The excess metal must then be broken from them. It should be borne in mind that all of the jewel settings recesses are formed by one operation upon the edges and upon the top side of the ornament.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a mold for casting ornaments as described, a male die adapted to engage in face contact with a female die and formed with openings for forming the bottom side of an ornament extending into the female die, said female die comprising several separable sections including a head piece edgewise separable with openings for forming the edge walls of the ornament and arranged to separate on the horizontal center line and having projections for forming the settings for jewels, and a back piece endwise separable with openings for forming the end wall of the ornament and having projections for forming the settings for the jewels, rods connecting with said head piece and slidably engaging through said female die for limiting the head piece to edgewise motion.

2. In a mold for casting ornaments as described, a male die adapted to engage in face contact with a female die and formed with openings for forming the bottom side of an ornament extending into the female die, said female die comprising several separable sections including a head piece edgewise separable with openings for forming the edge walls of the ornament and arranged to separate on the horizontal center line and having projections for forming the settings for jewels, and a back piece endwise separable with openings for forming the end wall of the ornament and having projections for forming the settings for the jewels, rods connecting with said head piece and slidably engaging through said female die for limiting the head piece to edgewise motion, and knobs upon the ends of said rods to facilitate motion of the head piece and limit said motion.

3. In a mold for casting ornaments as described, a male die adapted to engage in face contact with a female die and formed with openings for forming the bottom side of an ornament extending into the female die, said female die comprising several separable sections including a head piece edgewise separable with openings for forming the edge walls of the ornament and arranged to separate on the horizontal center line and having projections for forming the settings for jewels, and a back piece endwise separable with openings for forming the end wall of the ornament and having projections for forming the settings for the jewels, said head piece and a portion of the main piece of said female die being formed with recesses communicating with the back of the die, and said projections constituting pins engaged through the head piece and main portion of the female die and having their rear ends extending into said recesses.

4. In a mold for casting an ornament of substantially cubic form with jewel settings on one end and four sides, a male die and a female die, the female die being formed with an opening for the molten metal to form said end and four sides of said ornament, said female die comprising several sections including a head piece linear edgewise separable from a main piece, said head piece containing surfaces for forming adjacent two of said sides and opposed to surfaces in the main piece for forming other adjacent two of said sides, conical projections from said four surfaces for forming jewel settings, and said conical projections being shaped to freely remove from said jewel settings upon linear edgewise separation from the head piece from the main piece.

5. In a mold for casting an ornament of substantially cubic form with jewel settings on one end and four sides, a male die and a female die, the female die being formed with an opening for the molten metal to form said end and four sides of said ornament, said female die comprising several sections including a head piece linear edgewise separable from a main piece, said head piece containing surfaces for forming adjacent two of said sides and opposed to surfaces in the main piece for forming other adjacent two of said sides, conical projections from said four surfaces for forming jewel settings, said conical projections being shaped to freely remove from said jewel settings upon linear edgewise separation from the head piece from the main piece, and a back piece endwise separable and formed with a surface for forming the end of said ornament.

6. In a mold for casting an ornament of substantially cubic form with jewel settings on one end and four sides, a male die and a female die, the female die being formed with an opening for the molten metal to form said end and four sides of said ornament, said female die comprising several sections including a head piece linear edgewise separable from a main piece, said head piece containing surfaces for forming adjacent two of said sides and opposed to surfaces in the main piece for forming other adjacent two of said sides, conical projections from said four surfaces for forming jewel settings, said conical projections being shaped to freely remove from said jewel settings upon linear edgewise separation from the head piece from the main piece, and a back piece endwise separable and formed with a surface for forming the end of said ornament, said latter mentioned surface being provided with projections to form jewel settings in the ornament.

7. In a mold for casting an ornament of substantially cubic form with jewel settings on one end and four sides, a male die and a female die, the female die being formed with an opening for the molten metal to form said end and four sides of said ornament, said female die comprising several sections including a head piece linear edgewise separable from a main piece, said head piece containing surfaces for forming adjacent two of said sides and opposed to surfaces in the main piece for forming other adjacent two of said sides, conical projections from said four surfaces for forming jewel settings, and said conical projections being shaped to freely remove from said jewel settings upon linear edgewise separation from the head piece from the main piece, said conical projections having apexes of 45°, and said adjacent surfaces being at angles of 45° to the contacting plane of said head piece and main piece.

8. In a mold for casting ornaments, die sections with openings for the molten metal to form the sides of the ornament, recesses extended in from a surface of the die sections and arranged around said openings, and pins engaged through the die sections extending from the recesses into said openings and having their front ends arranged for forming jewel settings and having their rear ends extending into the said recesses.

BERNAT MECHLOVITS.